United States Patent
Dilger

(10) Patent No.: US 12,411,100 B2
(45) Date of Patent: Sep. 9, 2025

(54) DEVICE AND METHOD FOR ASCERTAINING A PROPERTY OF A FLUID, FLUID CONTAINER AND VEHICLE

(71) Applicant: AST (ADVANCED SENSOR TECHNOLOGIES) INTERNATIONAL ASSET GMBH, Calw (DE)

(72) Inventor: Stefan Dilger, Donaueschingen (DE)

(73) Assignee: AST (ADVANCED SENSOR TECHNOLOGIES) INTERNATIONAL ASSET GMBH., Calw (DE)

( * ) Notice: Subject to any disclaimer, the term of this patent is extended or adjusted under 35 U.S.C. 154(b) by 409 days.

(21) Appl. No.: 17/922,467

(22) PCT Filed: Apr. 28, 2021

(86) PCT No.: PCT/EP2021/061124
§ 371 (c)(1),
(2) Date: Oct. 31, 2022

(87) PCT Pub. No.: WO2021/219709
PCT Pub. Date: Nov. 4, 2021

(65) Prior Publication Data
US 2023/0168215 A1 Jun. 1, 2023

(30) Foreign Application Priority Data

Apr. 30, 2020 (DE) .................... 10 2020 111 862.7
Jun. 10, 2020 (DE) .................... 10 2020 115 467.4
Nov. 25, 2020 (DE) .................... 10 2020 131 192.3

(51) Int. Cl.
*G01N 25/18* (2006.01)
*G01N 27/06* (2006.01)

(52) U.S. Cl.
CPC ............. *G01N 25/18* (2013.01); *G01N 27/06* (2013.01)

(58) Field of Classification Search
CPC .............................. G01N 25/18; G01N 27/06
See application file for complete search history.

(56) References Cited

U.S. PATENT DOCUMENTS

| | | | |
|---|---|---|---|
| 3,888,110 A | 6/1975 | Clark | |
| 5,379,630 A * | 1/1995 | Lacey | G01N 30/66 324/105 |

(Continued)

FOREIGN PATENT DOCUMENTS

| | | |
|---|---|---|
| DE | 1 498 695 A1 | 5/1969 |
| DE | 101 23 920 A1 | 11/2002 |

(Continued)

OTHER PUBLICATIONS

Sep. 21, 2021 International Search Report issued in International Patent Application No. PCT/EP2021/061124.

(Continued)

*Primary Examiner* — Mirellys Jagan
(74) *Attorney, Agent, or Firm* — Oliff PLC

(57) ABSTRACT

A device for ascertaining a property of a fluid, having: an electric conductor assembly which is designed to be at least partly brought into contact with the fluid and which is designed as a voltage divider with two elements, wherein the first element is a first conductor which, at least in a current-conducting state, has a resistance value that differs from that of the second element; a measuring bridge with two voltage dividers connected in parallel, one of said voltage dividers being formed by the electric conductor assembly; an actuation unit for applying an AC voltage to the measuring bridge; a voltage detection unit for detecting a bridge voltage; and an analysis unit which is configured to ascertain a thermal (Continued)

conductivity as the property of the fluid by analyzing the bridge voltage using the 3-omega method.

15 Claims, 12 Drawing Sheets

(56) References Cited

U.S. PATENT DOCUMENTS

| | | | |
|---|---|---|---|
| 7,362,105 | B2 | 4/2008 | Eisenschmid et al. |
| 2024/0151675 | A1* | 5/2024 | Dilger .................... G01N 27/18 |

FOREIGN PATENT DOCUMENTS

| | | | |
|---|---|---|---|
| DE | 10 2016 205 776 A1 | 10/2017 | |
| EP | 0 640 830 A1 | 3/1995 | |
| EP | 1 983 336 A1 | 10/2008 | |
| WO | WO-2021219508 A1 * | 11/2021 | ............. G01F 23/14 |

OTHER PUBLICATIONS

Sep. 21, 2021 Written Opinion issued in International Patent Application No. PCT/EP2021/061124.

Dong-wook Oh. "Thermal Conductivity Measurement of Liquids by Using a Suspended Microheater". International Journal of Thermophysics, Springer New York USA, Springer New York LLC, US, vol. 38, No. 10, Aug. 16, 2017, pp. 1-8.

Mar. 25, 2021 Search Report issued in German Patent Application No. 10 2020 131 192.3.

Sh. Azarfar et al. "Low Cost and New Design of Transient Hot-Wire Technique for the Thermal Conductivity Measurement of Fluids". Applied Thermal Engineering, vol. 105, 2016, pp. 142-150.

Jason Randall Foley. "The 3-Omega Method as a Nondestructive Testing Technique for Composite Material Characterization". Auburn University, Master Thesis, 1999.

Seung-Min Lee. "Thermal Conductivity Measurement of Fluids Using The 3ω Method". Review of Scientific Instruments, 2009, vol. 80, pp. 024901-1-024901-7.

Scott N. Schiffres et al. "Improved 3-Omega Measurement of Thermal Conductivity in Liquid, Gases, and Powders Using a Metal-Coated Optical Fiber". Review of Scientific Instruments, 2011, vol. 32, pp. 064903-1-064903-7.

Roder, H.M., "A Transient Hot Wire Thermal Conductivity Apparatus for Fluids," Journal of Research of the National Bureau of Standards, vol. 86, No. 5, pp. 457-493, Sep.-Oct. 1981.

Jan. 4, 2024 Office Action issued in European Patent Application No. 21723172.9.

* cited by examiner

DEVICE AND METHOD FOR ASCERTAINING A PROPERTY OF A FLUID, FLUID CONTAINER AND VEHICLE

BACKGROUND

The present invention relates to a device and a method for ascertaining a property, in particular a thermal conductivity, of a fluid, in particular of a fluid mixture formed from a plurality of fluids, which is in particular a washing liquid or an aqueous urea solution for the exhaust gas after-treatment for a vehicle, as well as to a fluid container and a vehicle.

Optical sensors, e.g. cameras, LIDAR, radar, etc., are increasingly installed in vehicles, which are required for driver assistance systems and/or a system for autonomous driving. When optical sensors are used for the above-mentioned purposes, it is necessary to ensure detection accuracy in all weather conditions. For this reason, reliable cleaning of the optical sensors by a washing system is of great importance.

Conventional washing systems, which have been used in vehicles mainly for cleaning a window and/or a light source to date, do not have a possibility to monitor the washing liquid, so that at low temperatures there is often a problem that a fluid mixture, which is mixed from water and at least one antifreeze liquid and is used as washing liquid, freezes in a fluid container, in a line to a spray nozzle or on a window due to an insufficient amount of the antifreeze liquid. As a result, cleaning is not feasible or visibility is even worsened.

In addition, an aqueous urea solution (also known as AdBlue (registered trademark)) is used in modern diesel vehicles for the exhaust gas after-treatment (selective catalytic reduction (SCR)) to achieve a reduction in the nitrogen oxides (NOx) emitted. The amount of urea in the aqueous urea solution is here 32.5% by default, e.g. as delivered, a range between 31.8% and 33.3% being permissible for use in a vehicle. Since urea is gradually decomposed by UV radiation, the urea concentration in a container in which the aqueous urea solution is stored for the purpose of a refill and which is exposed to sunlight can change over time. In addition, water can evaporate from the container or a fluid container in the vehicle so that the urea concentration will also change over time. In this regard, a check of a required urea concentration can here be performed by means of a refractometer, which is, however, costly and therefore impractical when operating the diesel vehicle.

It is therefore an object of the present invention to provide a device, a method, a fluid container and a vehicle which eliminate the above-mentioned disadvantages. Accordingly, it is possible to reliably prevent freezing of the fluid mixture which is used as a washing liquid and/or to ensure a required concentration of an aqueous urea solution for the purpose of an exhaust gas after-treatment.

BRIEF SUMMARY

The object with respect to the device is solved according to the features of claim 1, with respect to the fluid container according to the features of claim 11, with respect to the vehicle according to the features of claim 14, and with respect to the method according to the features of claim 15. Further advantageous embodiments are specified in the dependent claims.

According to the invention, a property, in particular the thermal conductivity, of a fluid, in particular of a fluid mixture which is used, for example, as a washing liquid or for exhaust gas after-treatment, is ascertained in order to draw a conclusion about the composition or a degree of impurity thereof. For this purpose, a device for ascertaining the property of the fluid or the fluid mixture includes an electric conductor assembly which is designed such that it can be at least partly or substantially completely or fully brought into contact with the fluid. The conductor assembly is designed as a voltage divider and has two elements. A voltage divider is, for example, understood to mean a series circuit of, in particular passive, electrical two-terminal networks through which an electrical voltage is divided.

The device according to the invention has a measuring bridge with two voltage dividers connected in parallel, each having two elements. One of the voltage dividers is formed by the above-mentioned conductor assembly. Furthermore, the device has an actuation unit for applying an AC voltage to the measuring bridge and a voltage detection unit for detecting a bridge voltage.

In addition, the device has an analysis unit configured to ascertain the property, in particular the thermal conductivity, of the fluid by analyzing the bridge voltage using the 3-omega method. By using the device, it can be ascertained whether the fluid has a predetermined property, for example, the predetermined thermal conductivity, such that e.g. freezing is reliably prevented at a temperature corresponding to the predetermined thermal conductivity. In addition, it can be ascertained, for example, whether a fluid used for exhaust gas after-treatment has a required urea content. For this purpose, a signal can be output via a corresponding component, such as a display and/or a speaker, if there is a risk of freezing or if the concentration of the fluid used for exhaust gas after-treatment is too low/high, for example.

The first element of the conductor assembly is preferably a first conductor which, at least in the current-conducting state, has a resistance value which differs from that of the second element. Accordingly, the measuring bridge is detuned when an AC voltage is applied to the measuring bridge so that a bridge voltage can be detected by the voltage detection unit.

The second element of the conductor assembly can be a second conductor having a same resistance value as the first conductor in a currentless state. Preferably, the two conductors are here formed in such a way that the first conductor heats up more than the second conductor in a current-conducting state. Accordingly, a resistance value of the first conductor can differ from that of the second conductor and the measuring bridge can be detuned such that a bridge voltage is detectable.

According to another aspect, the second element can be a fixed resistor used in place of the second conductor. For example, a fixed resistor is a resistor that does not substantially change its resistance value even when current is flowing through it, and thus can be considered substantially constant under any conditions. When the fixed resistor is used, the two resistors of the other voltage divider are preferably designed such that their resistance value can be adjusted or changed. Preferably, the two adjustable resistors are designed as digital potentiometers. In the current-conducting state, the first conductor heats up and therefore changes its resistance value so that the first conductor and the fixed resistor have a different resistance value in the current-conducting state. The resistance value of the first conductor is here preferably greater than that of the fixed resistor. However, the resistance value of the first conductor can also be smaller than that of the fixed resistor. When using the fixed resistor, the analysis unit is preferably configured to adjust the two adjustable resistors before applying an AC voltage to the measuring bridge. This configuration offers the advantage of reducing requirements with respect to the manufacturing accuracy, which is necessary, for example, to ensure that the first and second conductors have the same resistance value in a currentless state. In addition, a detection accuracy is increased since the measuring bridge is reliably adjusted before the ascertaining of the thermal conductivity is started by the analysis unit.

According to one aspect of the present invention, the fluid can be a fluid mixture formed from two fluids, preferably each of which having a thermal conductivity that is known. The analysis unit can be configured to ascertain a concentration or mixing ratio as the property of the fluid mixture by comparing the thermal conductivity of the fluid mixture to the thermal conductivities of the two fluids from which the fluid mixture is mixed. Accordingly, a mixing ratio of the fluid mixture can be accurately determined. It should be noted that at least one of the two fluids can also be a fluid mixture, provided that the thermal conductivity thereof is known. In this regard, ascertaining a mixing ratio offers the advantage that the composition of the fluid mixture can be Indicated to a user in an easily understandable manner.

According to a further aspect of the present invention, a freezing point of each of the two fluids from which the fluid mixture is formed can additionally be known. For example, the analysis unit is configured to ascertain a freezing point as the property of the fluid mixture using the concentration of the fluid mixture. Accordingly, a freezing point of the fluid mixture can be accurately determined, allowing a user to better analyze whether the fluid mixture is suitable for a particular temperature.

According to another aspect of the present invention, the fluid can be a fluid mixture preferably formed from two fluids, a thermal conductivity and a freezing point of each of which can be known. The analysis unit can be configured to ascertain a freezing point as the property of the fluid mixture by comparing the thermal conductivity with a characteristic line, in particular in the form of a straight line. The straight line is obtained by linear interpolation using the thermal conductivity and the freezing point of the fluids as the sampling points in each case. In order to obtain the straight line, the values of the thermal conductivity of the two fluids are respectively plotted on an x-axis of a Cartesian coordinate system and the values of the freezing points of the two fluids are plotted on a y-axis of the Cartesian coordinate system. The ascertained value of the thermal conductivity of the fluid mixture formed from the two fluids is then also plotted on the x-axis, and the associated value of the freezing point of the thermal conductivity can consequently be ascertained as the y-axis value of the straight line at this point. By this linear interpolation, the freezing point can be easily ascertained and a user can accurately judge whether the fluid mixture is suitable for a particular temperature.

According to a further aspect of the present invention, preferably a cross-sectional area of the first conductor is smaller than that of the second conductor. This design of the two conductors easily ensures that the first conductor heats up more than the second conductor in a current-conducting state.

According to an additional aspect of the present invention, the ratio between the cross-sectional areas of the first conductor and the second conductor can be in the range of 3 to 5 and preferably be equal to 4. However, the ratio of the cross-sectional areas of the first conductor and the second conductor can also range from 2 to 6. This design of the first conductor and the second conductor ensures that the first conductor is sufficiently heated to allow good detection accuracy of the change in resistance.

According to one aspect of the present invention, the AC voltage is preferably sinusoidal. Accordingly, the applied AC voltage can be generated in a simple manner and is suitable for processing in the 3-omega method.

According to a further aspect of the present invention, a current intensity of a current flowing through the conductor assembly is advantageously in the range of 150 mA to 250 mA and is preferably 200 mA. However, the current intensity can also be in the range of 100 mA to 300 mA. By setting the current intensity to this range, a good adaptation of the device for an electrical system of a vehicle and a good detection accuracy of the resistance change is achieved.

According to a preferred aspect of the present invention, the first and second conductors can be arranged adjacent to each other. For example, they can engage behind one another and/or overlap each other. Preferably, the two conductors are arranged on a common holding assembly.

According to one aspect of the present invention, preferably the first conductor and the second conductor are arranged on a common circuit board or holding assembly. In this regard, the first conductor and the second conductor can have a meandering configuration. Due to a meandering arrangement of one conductor or both conductors on the circuit board, a space-saving conductor assembly is achieved. In addition, the use of a standard circuit board (e.g., an FR4 circuit board) renders possible a low-cost and easy-to-manufacture conductor assembly.

If a conductor is meander-shaped, it has, for example, at least two legs at a parallel distance and/or adjacent to each other, which are connected via a connecting portion. Preferably, a plurality of such legs is provided which are arranged adjacent to one another and are connected via connecting portions. For example, the first conductor can be arranged on the holding assembly between the legs of the second conductor. These two legs of the second conductor, between which the first conductor is arranged, can in this case be spaced apart from one another by a greater distance than the other legs. The first conductor is then preferably also formed with two or more legs which are connected via one or more connecting portions. These legs can be arranged next to one another, preferably at a parallel distance. At least one or both conductors are advantageously arranged as compactly as possible.

According to another aspect of the present invention, the first and/or the second conductor can be formed as wires. A wire is understood to be, for example, a metallic conductor with a round or angular or flat or square or profiled cross-section, which is fully surrounded by the fluid mixture except for its attachment portion(s) or if it is not arranged or attached on a substrate or in a holder. The conductors, formed as a wire, can be shaped or arranged in a rigid form, as a helix, as a loop, in a meandering shape, or in some other manner coiled or bent. Experiments have shown that the use of wires as first and/or second conductor significantly improves a detection accuracy, in particular compared to a design in the form of conductor paths. Even if the wires are attached to a conductor path or a substrate approximately like conductor paths, detection accuracy is improved because the wires can still be brought into fluid contact with a large circumferential surface area. The helical shape or an arrangement as a loop also allows for a compact design of the device.

The conductors formed as wires or the conductor formed as a wire can be prestressed by means of at least one elastic element so as to compensate for a change in length that occurs due to heating in the current-conducting state or a change in length of the holding assembly due to a change in temperature. The elastic element can here preferably be designed as a spring element. In this way, the conductor(s) formed as (a) wire(s) can be prevented from coming into contact with other conductive portions of the device or with itself in the event of a change in length or a change in the shape or length of the holding assembly. In this way, a short circuit of the wires can be reliably prevented. In addition, damage to the often thin and sensitive wires due to excessive tension on the wires is reliably prevented so that the device according to the invention, which comprises wires, can also be used for an application in an environment that is subject to large temperature fluctuations, such as in a vehicle.

According to an advantageous aspect, protuberances can be formed on the circuit board or the holding assembly between the two conductors/wires or the conductor/wire. These protuberances can here be cylindrical or cuboidal. Preferably, the protuberances extend to a height that extends above a plane in which the conductors/wires are arranged. The protuberances can also be formed by arranging the conductor/wire in a groove or groove portion, such that regions outside the groove portion extend above a plane in which the conductor/wire is arranged. Since the freezing point of an aqueous urea solution is about −11° C., the case where the aqueous urea solution freezes can occur on cold winter days. Therefore, a heating element can be arranged in a fluid container to heat the aqueous urea solution. In addition, a washing liquid can also freeze if the amount of an antifreeze agent is too low. In a frozen state, the protuberances ensure that a frozen portion or part of the aqueous urea solution or the washing liquid is confined or interrupted in the area of the circuit board or the holding assembly. Consequently, this portion or part is easier to thaw and an ascertainment of thermal conductivity can be made more quickly. Furthermore, the protuberances ensure that contact between the wires/conductors and frozen parts/bodies is inhibited to prevent damage to the conductors/wires. Thus, the device according to the invention, which comprises wires, can also be used for an application in an environment exposed to low temperatures, such as in a vehicle. Moreover, the protuberances can be arranged to prevent contact between the first and second conductors or between individual meanders or portions of the conductors so that a short circuit can be reliably prevented.

In other words, at least one conductor portion or a plurality of conductor portions of the conductors/wires can be contacted by means of the fluid. The conductor(s) and/or conductor portion(s) extend(s) over a housing side of a housing that is open to the fluid or an open assembly side of the holding assembly. In turn, one or more protuberance(s) or protrusion(s) extend(s) from the housing side/assembly side, which span the conductor(s) and/or conductor portion(s), to protect them from mechanical force effects, such as ice contact.

According to a further advantageous aspect, the circuit board or the holding assembly can be protected with a cover or a lid, which can be formed such that the fluid, the thermal conductivity of which shall be ascertained, can pass to come into contact with the first and/or the second conductor. For this purpose, the cover or lid can be formed with slots or holes. Moreover, it is, due to this design possible to further reduce a frozen portion or part in the area of the conductor(s) or conductor assembly so that rapid thawing in the area of the device for ascertaining the thermal conductivity of the fluid is rendered possible. In addition, the cover can prevent moving frozen bodies from striking the conductors or the conductor, thereby reliably preventing damage.

According to a further aspect of the present invention, the first conductor and the second conductor can be made of the same material. In this way, a simple manufacturing of the first conductor and the second conductor can be achieved and a different material property of the two conductors need not be considered.

According to an additional aspect of the present invention, the first conductor and the second conductor can be covered or encompassed by an insulation layer. In an inexpensive manner, a varnish or solder resist can be provided as the insulation layer. In this way, an extremely compact arrangement of the conductors is achieved since a short circuit between adjacent meanders or helical turns of the conductor assembly is reliably prevented.

According to one aspect of the present invention, one of the fluids is water and the other of the fluids is an antifreeze liquid or ethanol. This composition of the fluid mixture is particularly suitable for use in a vehicle as a washing liquid due to the freezing point range of a fluid mixture of this type.

According to a further aspect of the present invention, one of the fluids is urea and the other of the fluids is water. This composition is particularly suitable for use in a diesel vehicle for an exhaust gas after-treatment.

According to an additional aspect of the present invention, preferably the drive circuit is formed in an inexpensive way and simply from two transistor booster stages. In this way, the DC voltage used in an electrical system of a vehicle can be converted into the AC voltage, preferably into a sinusoidal AC voltage.

According to a further aspect of the present invention, the analysis unit can be configured to filter a signal component of the bridge voltage having single and/or multiple frequency, preferably triple frequency, of the AC voltage by means of a software-implemented synchronous rectifier, also referred to as a software-implemented lock-in amplifier. In a software-implemented synchronous rectifier, the input signal, i.e. the bridge voltage, can be digitized by an A/D converter, preferably by an A/D converter of the analysis unit. Preferably, a table is stored in the analysis unit, in which normalized amplitude values of the signal component to be filtered are stored, i.e. the amplitude values of a sinusoidal voltage with the single or the multiple frequency of the voltage applied to the measuring bridge. Subsequently, the digitized values of the input signal can be multiplied, in particular correlated, with the values from the table. Then, preferably, a moving total is formed over a multiple of the length of the table, i.e. over a multiple of the period of the signal component. The moving total can then be used as a measure of the amplitude of the signal component to be filtered in the input signal, i.e. in the bridge voltage. In this way, no synchronous rectifier or other filter component which is designed as hardware and is cost-intensive is required, resulting in a significant cost saving for the device according to the invention. In addition, no reference signal needs to be provided in analog form, so that filtering of several signal components with different frequencies is made possible in a simple manner by storing different tables without having to provide a separate reference signal for each signal component. Accordingly, the complexity of a circuitry is also reduced.

A fluid container or liquid container according to the invention has the device for ascertaining the thermal conductivity of a fluid or fluid mixture. Accordingly, the thermal conductivity of a fluid or fluid mixture stored in the fluid container, e.g. a washing liquid or a liquid for exhaust gas after-treatment, can be ascertained. In this way, it can be reliably determined whether the fluid mixture is usable for an intended application.

According to one aspect of the present invention, the device for ascertaining thermal conductivity can be arranged in a sub-region of the fluid container that is spatially separated from a main region of the fluid container but can be in fluid communication with the main region. In this regard, the device can be partly or completely surrounded by a projected bottom or wall portion of the fluid container, and the bottom or wall portion can have slots or holes so that the fluid stored in the fluid container can be reliably brought into contact with the device for ascertaining the property of the fluid. In this way, a freezing portion in the area of the thermal conductivity detecting device can be limited and a duration for thawing can be reduced in this way by, for example, a heater disposed in the fluid container. Furthermore, a risk of mechanical damage to the thermal conductivity detecting device is reduced.

According to one aspect of the present invention, the fluid container can comprise a sensor for detecting a filling level. In particular, this sensor can be an ultrasonic sensor or a sensor for detecting the hydrostatic pressure in the fluid container. Thus, the filling level in the fluid container can additionally be determined. Furthermore, a component can be provided that issues an acoustic and/or optical warning, e.g. via a loudspeaker and/or a display, if the ascertained filling level is not sufficient for an intended application. Accordingly, in addition to the property of the fluid, the filling level in the fluid container can be determined and a warning can be issued if this filling level is too low for an intended application.

According to a particularly preferred aspect of the invention, the device for ascertaining the thermal conductivity of the fluid and the sensor for the filling level measurement can be formed as a common module. In this way, a cost-effective and space-saving arrangement can be achieved.

According to an additional aspect of the present invention, the fluid container can comprise a detection component that detects when liquids are filled in and/or drained from the fluid container. When liquids are filled in and/or drained from the fluid container, it can be assumed that water and/or antifreeze liquid or a liquid for the exhaust gas after-treatment having a different urea concentration is filled in or a portion of the fluid or fluid mixture is removed so that a thermal conductivity thereof is changed. Thus, the use of the detection component has the advantage that a redetermination of the thermal conductivity can be triggered to check whether the fluid continues to have a predetermined thermal conductivity.

A washing system according to the invention comprises the fluid container according to the preceding aspects. Thus, by using the washing system, a property, in particular a thermal conductivity, of the fluid or fluid mixture can be determined so that freezing of the washing liquid can be reliably prevented.

A device for the exhaust gas after-treatment according to the invention includes a fluid container according to the preceding aspects. Thus, by using the exhaust gas after-treatment device it is thus possible to determine a property, in particular a thermal conductivity, of a fluid or fluid mixture used for exhaust gas after-treatment so that exhaust gases emitted from a vehicle are reliably cleaned.

A vehicle according to the invention has a washing system with a fluid container according to any of the preceding aspects, which is used to clean a vehicle component and/or an optical sensor and/or a light source and/or a window. Accordingly, the property, in particular the thermal conductivity, of a fluid or fluid mixture used as a washing liquid for the vehicle can be determined to reliably prevent freezing thereof.

According to one aspect of the present invention, the vehicle has a vehicle component, in particular an optical sensor and/or a light source and/or a window, which is/are cleaned by the washing system. Accordingly, cleaning thereof is ensured even at low temperatures since freezing of the washing liquid in the washing system can be safely prevented by using the device according to the invention for ascertaining the property of the fluid.

According to another or additional aspect of the present invention, the vehicle according to the invention comprises an exhaust gas after-treatment device having a fluid container according to any of the preceding aspects. Consequently, the property of a fluid or fluid mixture used for the exhaust gas after-treatment can be determined to determine therefrom the urea concentration in the fluid mixture. In this way, reliable exhaust gas cleaning can be carried out.

A method according to the invention for ascertaining a property, in particular a thermal conductivity, of a fluid includes the following steps: Applying an AC voltage to a measuring bridge; detecting a bridge voltage; and ascertaining a thermal conductivity as the property of the fluid mixture by analyzing the bridge voltage using the 3-omega method.

According to one aspect of the present invention, the method can be carried out when detecting a filling and/or a draining of a fluid container according to any one of the preceding aspects. Accordingly, the frequency of an execution of the method can be reduced thereby reducing a processing load on the analysis unit.

According to another aspect of the present invention, the method can be carried out when an ignition of a vehicle is turned on and/or off. Accordingly, the frequency of an execution of the method can also be reduced so that a processing load on the analysis unit is reduced.

In the case where the second element of one voltage divider of the measuring bridge is formed as a fixed resistor and the two resistors of the other voltage divider of the measuring bridge are formed as adjustable resistors, it is, according to one aspect of the invention, possible to carry out an initial step for adjusting the measuring bridge. The analysis unit can then be designed to cause at least one of the two transistor booster stages to apply a DC voltage to the measuring bridge. In this case, the DC voltage has a value of 200 mV. However, the value of the DC voltage can also be between 100 mV and 500 mV, inclusive. The bridge voltage is then detected and the analysis unit changes the resistances of the two adjustable resistors. A DC voltage is then again applied to the measuring bridge and the bridge voltage is detected. This process is performed until the bridge voltage detected in response to the applied DC voltage is substantially equal to a 0 V voltage. Consequently, the measuring bridge can be reliably adjusted. Advantageously, this procedure is preferably carried out during a start-up or when a detection of the property is started in order to initially adjust the measuring bridge.

Alternatively or additionally, the analysis unit can be designed to filter out a signal component of the bridge voltage that corresponds to the onefold frequency of the AC voltage applied to the measuring bridge. The amplitude of this signal component of the bridge voltage can be used as a measure of the detuning of the measuring bridge, and the analysis unit can be designed to change the resistance value of the adjustable resistors such that the signal component of the bridge voltage corresponding to the onefold frequency of the applied AC voltage is substantially 0 V. This approach offers the advantage that detuning of the measuring bridge can be detected during a measuring operation. Accordingly, detuning of the measuring bridge occurring, for example, as a result of heating during an operation can be detected and the measuring bridge can then be adjusted.

In a further embodiment of the invention, a spare tank containing an antifreeze liquid or urea can be provided in one or more of the above-mentioned aspects. This spare tank can be fluidly connected to the fluid container. It would then be conceivable for the antifreeze liquid to be supplied into the fluid container when required, for example via a controllable valve. This is done, for example, when it is determined that there is insufficient antifreeze liquid or urea in the fluid container.

BRIEF DESCRIPTION OF DRAWINGS

The present invention is described below with reference to the accompanying drawings, in which.

DETAILED DESCRIPTION

Figure 1:
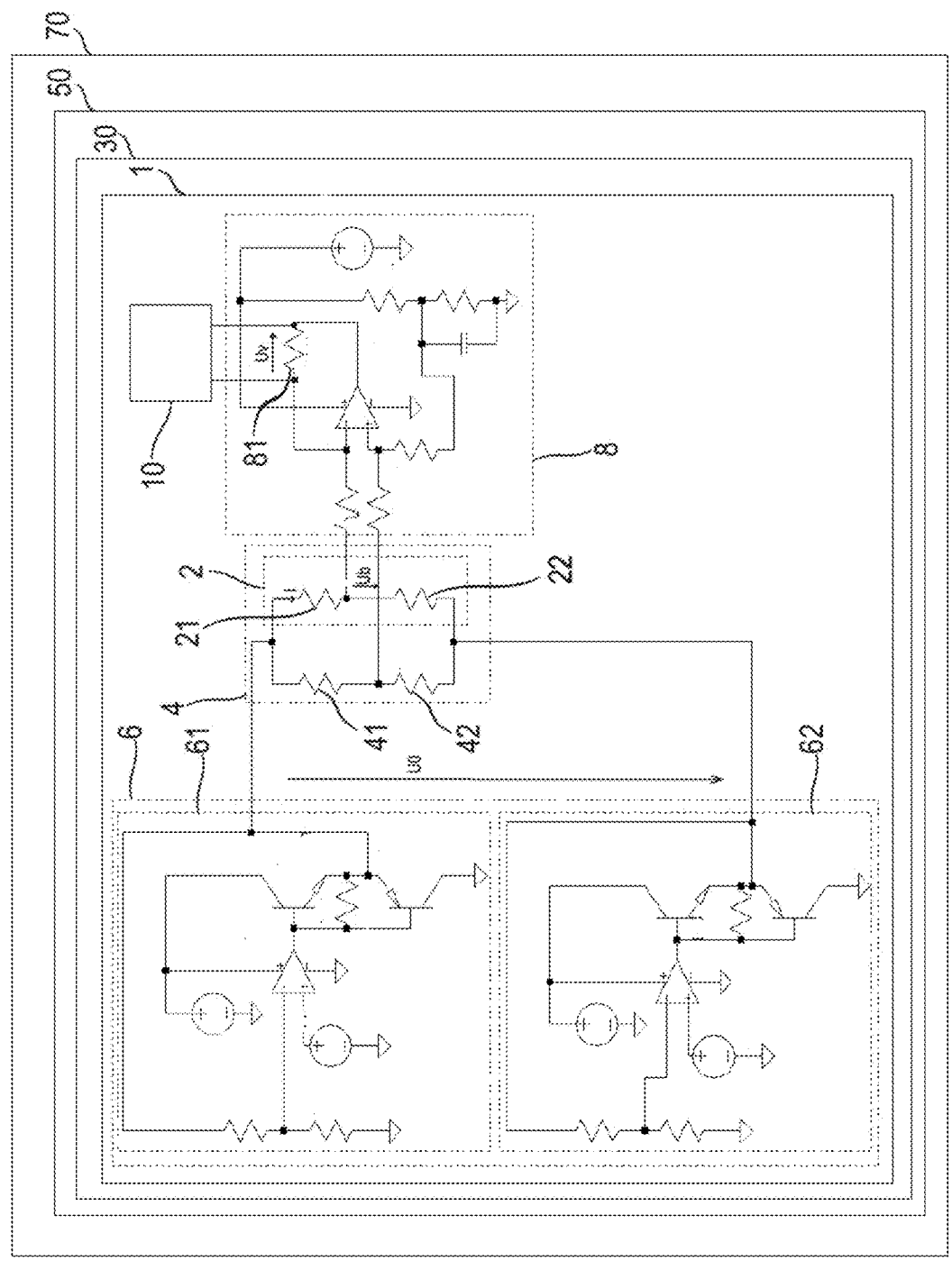
FIG. 1 schematically shows a circuit diagram of a device for ascertaining a property of a fluid mixture used in a fluid container of a vehicle washing system.

An embodiment of the present invention is described below. FIG. 1 schematically shows a circuit diagram of a device 1 for ascertaining a property, in particular a thermal conductivity, of a fluid. In the present embodiment, the fluid is in particular a fluid mixture mixed from water and ethanol, which is the basis for most commercially available antifreeze liquids, and is used as a washing liquid for a washing system 50 of a vehicle 70 for cleaning an optical sensor, a window and/or a light source. For this purpose, the washing liquid is stored in a fluid container 30. For this reason, the washing liquid is to be understood as a fluid mixture in the following description. Furthermore, the device 1 according to the present embodiment is designed for an application in a vehicle 70.

In the present embodiment, a thermal conductivity of the washing liquid is used as a measure of the mixing ratio of water to ethanol. Water has a thermal conductivity of 0.556 [W/(m*K)], and ethanol has a thermal conductivity of 0.173 [W/(m*K)]. Accordingly, a washing liquid mixed from water and ethanol has a thermal conductivity that is between these two values so that it is possible to draw a conclusion about the mixing ratio of the washing liquid by comparing the determined thermal conductivity with a predetermined thermal conductivity. If, for example, it is necessary for a minimum amount of ethanol to be present in the washing liquid in order to reliably prevent freezing, the value of the ascertained thermal conductivity must be less than or equal to the predetermined thermal conductivity. In this case, the predetermined thermal conductivity is predetermined in advance by a manufacturer of the device 1, the washing system 50 or the vehicle 70. The predetermined thermal conductivity can also be adjusted accordingly on the basis of different influences, for example, date, location, weather forecast, etc.

For this purpose, the device 1 for ascertaining a thermal conductivity of a fluid mixture formed from a plurality of fluids has an electric conductor assembly 2, a measuring bridge 4, an actuation unit 6, a voltage detection unit 8 and an analysis unit 10.

The electric conductor assembly 2 is designed in such a way that it can be brought at least partly into contact with the washing liquid. The electric conductor assembly 2 shown in FIGS. 1 and 2 is brought into contact with the fluid mixture by being completely immersed in the washing liquid, which is stored in the fluid container 30 of the washing system 50, so that it is completely surrounded by the fluid mixture.

The electric conductor assembly 2 has a first conductor 21 and a second conductor 22 in a series connection. The first conductor 21 and the second conductor 22 have an equal resistance value in a currentless state. Furthermore, the two conductors 21, 22 are configured such that in a current-conducting state the first conductor 21 heats up more than the second conductor 22.

Figure 2:
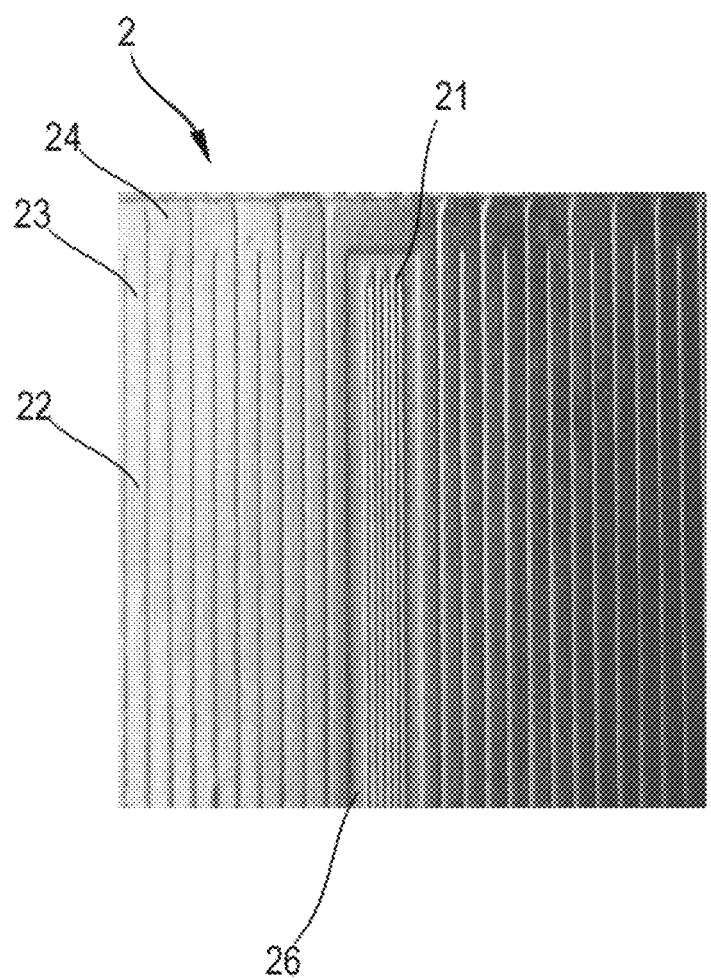
FIG. 2 shows a conductor assembly according to one embodiment of the present invention, having a first conductor and a second conductor, both mounted on a circuit board.

In the present embodiment, the conductor assembly 2 shown in FIG. 2 is used in which the two conductors 21, 22 are arranged in the form of conductor paths on a circuit board 26 in a meandering manner. To achieve a meandering arrangement, the two conductors 21 and 22 have a plurality of legs 23 and connecting portions 24 between these legs 23, as shown in FIG. 2. In the example of FIG. 2, the first conductor 21 is also arranged in a meandering manner between two legs 23 of the second conductor 22. However, the arrangement of the two conductors 21 and 22 is not limited to the arrangement shown, and the two conductors 21 and 22 can, for example, also be arranged in a meandering manner only in sections. Moreover, it is also possible to only arrange one of the two conductors 21, 22, preferably the second conductor 22, in a meandering manner. By applying the two conductors 21, 22 in the form of conductor paths on the circuit board 26, for example on an FR4 circuit board, by a known printing process, a low-cost and robust conductor assembly 2 can be obtained. In addition, the meandering arrangement of the two conductors 21, 22 has the advantage of a space-saving arrangement of the conductor assembly 2 in the fluid container 30.

As is shown in FIG. 2, a cross-sectional area of the first conductor 21 is smaller than that of the second conductor 22. Consequently, the second conductor 22 must be longer than the first conductor 21 by the factor by which the cross-sectional area of the second conductor 22 is larger than that of the first conductor 21, so that the first conductor 21 and the second conductor 22 have the same resistance value in the currentless state. In the electric conductor assembly 2 shown in FIG. 2, the cross-sectional area of the second conductor 22 is larger by a factor of 4 so that the first conductor 21 must have 4 times the length to have the same resistance value. However, the factor is not limited to a factor of 4 and may be in the range of 3 to 5. Such a design of the two cross-sectional areas ensures sufficient detection accuracy in the case of a change in resistance in the current-conducting state described below.

In the present embodiment, the two conductors 21, 22 are implemented by conductor paths made of copper. However, another material, such as nickel, can also be used. Preferably, the two conductors 21, 22 are made of the same material so that an influence of a different material does not have to be considered in the dimensioning and the resistance change in the current-conducting state described later. Moreover, If the same material is used, it is easier to manufacture the electric conductor assembly 2.

Furthermore, the first and second conductors 21, 22 are preferably covered with solder resist so that a short circuit between the individual meanders of the first and second conductors 21, 22 is avoided due to the washing liquid present therebetween.

When a current flows through the two conductors 21, 22 connected in series, the first conductor 21 is heated more than the second conductor 22 due to its smaller cross-sectional area. Consequently, a resistance value of the first conductor 21 increases more than the resistance value 22 of the second conductor. Since the conductor assembly 2 is fully immersed in the fluid mixture, the amount of heating of the first conductor 21 also depends on a thermal conductivity of the washing liquid. If the washing liquid has a high thermal conductivity, the first conductor 21 will heat up less than if the washing liquid has a low thermal conductivity. Thus, a washing liquid having a high thermal conductivity cools the first conductor 21 better than a washing liquid having a low thermal conductivity. Accordingly, the magnitude of the change in resistance of the first conductor 21 can be used as a measure of the thermal conductivity of the washing liquid.

In order to detect this change in resistance of the first conductor 21, as shown in FIG. 1, a measuring bridge 4, which is designed, for example, as a Wheatstone measuring bridge, with two voltage dividers connected in parallel is used, one of the voltage dividers being formed by the electric conductor assembly 2, i.e. consequently by the series connection of the first conductor 21 and the second conductor 22. The other voltage divider is formed by two resistors R1 and R2, each having the same resistance value. The use of the measuring bridge 4 has the advantage that due to a change in the ambient temperature a change in the resistance values of the first conductor 21 and the second conductor 22 is fully compensated.

In order to generate a current flow in the two conductors 21, 22, an AC voltage is applied to the measuring bridge 4 by the actuation unit 6. In the present embodiment, the actuation unit 6 is formed by two transistor booster stages 61, 62, so that it is possible to convert the DC voltage of the electrical system of the vehicle 70 into an AC voltage. For this purpose, the first transistor booster stage 61 applies a positive voltage and the second transistor booster stage 62 applies a negative voltage alternately to the measuring bridge 4. In this case, the alternating voltage is in particular a sinusoidal alternating voltage, so that the 3-omega method described below can be carried out. The actuation unit 6 applies the AC voltage to the measuring bridge 4 so that a current in the range of approximately 200 mA flows in the series connection of the first and second conductors 21 and 22. However, the current intensity is not limited to this value and can be in the range of 150 mA to 250 mA. The first conductor 21 heats up by a few Kelvins in the current-conducting state, which increases its resistance value, which in turn causes the measuring bridge 4 to become detuned. Consequently, a bridge voltage Ub is applied between the two voltage dividers, which is detected by the voltage detection unit 8.

In the present embodiment, as shown in FIG. 1, the voltage detection unit 8 is designed as an amplifier unit, in particular as a differential amplifier, in order to amplify the detected bridge voltage Ub by a predetermined factor so that an amplified voltage Uv is obtained which is tapped at the resistor 81 by the analysis unit 10. The amplified voltage Uv thus corresponds to the bridge voltage Ub, and a processing of the amplified voltage Uv is to be understood as a processing of the bridge voltage Ub.

In the present embodiment, the analysis unit 10 is formed by a known microcontroller having RAM, ROM, CPU, V/O ports, A/D converter, etc. The analysis unit 10 is configured to ascertain the thermal conductivity of the fluid mixture by analyzing the bridge voltage Ub or the amplified voltage Uv corresponding to the bridge voltage Ub, using the 3-omega method, as the property of the fluid or fluid mixture.

The 3-omega method was first described by Jason Randall Foley in 1999 in "The 3-omega method as a nondestructive testing technique for composite material characterization". The contents thereof are incorporated herein by reference.

In the 3-omega method, a metal wire in contact with a sample, i.e. the first conductor 21, is used as both a heater and a thermometer. The AC voltage U0 is applied to the measuring bridge 4 by the actuation unit 6, as described above, so that the current I flows through the first conductor 21 at the same frequency. Consequently, a power oscillating at twice the frequency is converted into heat in the first conductor 21, so that a temperature of the first conductor 21, and consequently also its resistance value, changes at twice the frequency of the applied AC voltage U0.

Consequently, the measuring bridge 4 is detuned and the bridge voltage Ub, which also oscillates at twice the frequency as the resistance change, is generated. In the present embodiment, the resistance values of the two resistors 41, 42 forming the second voltage divider of the bridge circuit 4 and the resistance values of the first conductor 21 and the second conductor 22 are designed to have the same resistance value R in a currentless state. In addition, the second conductor 22 is designed such that its resistance value does not substantially change in a current-conducting state. This has the advantage that the bridge voltage is proportional to the change in resistance $\Delta R_{21}$ of the first conductor 21 and can be expressed by the following equation:

$$Ub = \frac{1}{4} \cdot \frac{\Delta R_{21}}{R} \cdot U0$$

Figure 12:
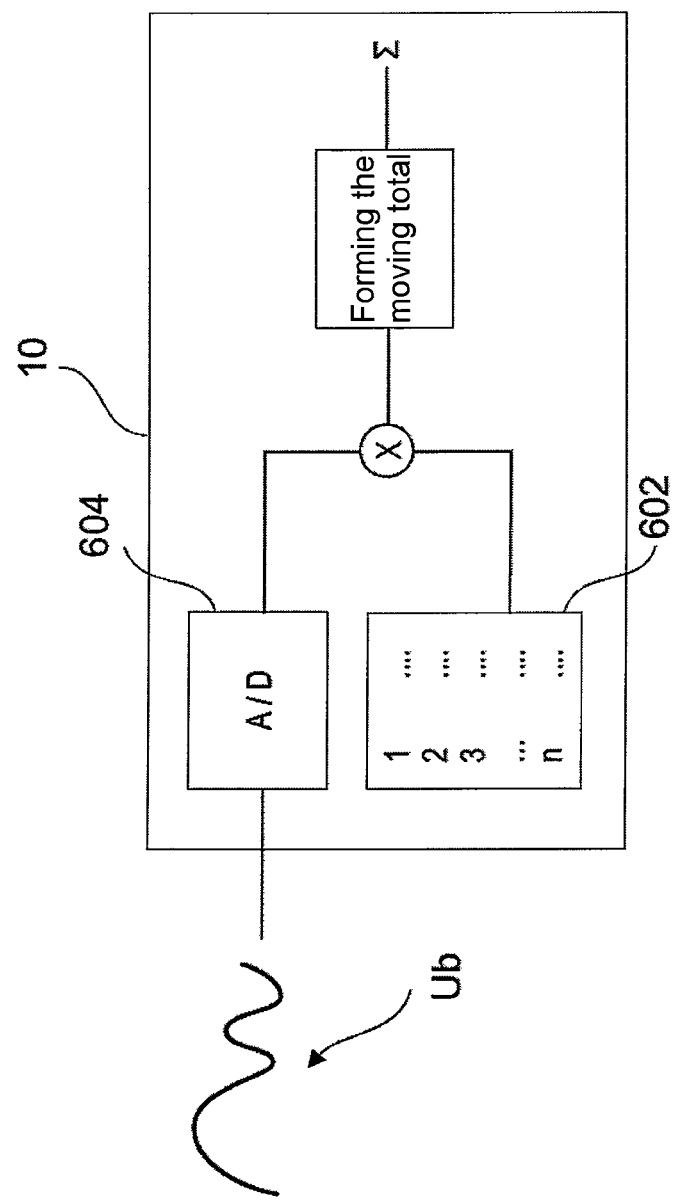
FIG. 12 shows a schematic block diagram of a software-implemented synchronous rectifier.

Consequently, the bridge voltage Ub has a signal component that is three times the frequency of the AC voltage applied to the measuring bridge 4. The filtering of this so-called 3-omega signal component is done in software. The analysis unit 10 is therefore configured to filter a signal component of the bridge voltage Ub that has several times the frequency, preferably three times the frequency, of the AC voltage by means of a software-implemented synchronous rectifier or software-implemented lock-in amplifier shown in FIG. 12. Instead of a reference signal, the software-implemented synchronous rectifier uses a table 602 in which the amplitude values of the signal component with the multiple frequency, preferably the triple frequency, are stored in a normalized manner as a reference. The analysis unit 10 then correlates the values of the bridge voltage Ub digitized by means of an A/D converter 604 of the analysis unit 10 with the normalized amplitude values stored in table 602 and forms a moving total over a multiple of the length of the table, i.e. over a multiple of the period of the signal component. The sum 2 can subsequently be used as a measure of the proportion or amplitude of the signal component in the bridge voltage Ub. Accordingly, the 3-omega signal component can be ascertained in a simple and inexpensive manner.

According to the 3-omega method, the amplitude of the signal with three times the frequency of the bridge voltage is a direct measure of the thermal conductivity of the fluid. As already mentioned, the ascertained thermal conductivity is between the two values for the thermal conductivity of water and ethanol, so it can be used as a measure of the mixing ratio. The ascertained thermal conductivity can then be compared to a predetermined thermal conductivity to assess whether a mixing ratio of the washing liquid stored in the fluid container 30 is suitable for the intended application in the washing system 50 of the vehicle 70, such that freezing is reliably prevented. For example, if it is necessary for a minimum amount of ethanol to be present in the washing liquid to reliably prevent freezing, the value of the ascertained thermal conductivity must be less than or equal to the predetermined thermal conductivity. However, if the ascertained thermal conductivity is greater than the predetermined thermal conductivity, a suitable warning signal can be displayed to a driver of the vehicle 70 via a display and/or a loudspeaker of the vehicle, for example, so that the driver is prompted to change the mixing ratio of the washing liquid.

According to a further embodiment, the fluid container 30 includes a sensor for measuring the filling level. In this case, the sensor is an ultrasonic sensor for measuring the filling level or a sensor for measuring the hydrostatic pressure. Accordingly, it can be ensured that not only freezing of the washing liquid is prevented but also that a sufficient amount of washing liquid is additionally present in the fluid container 30. This is particularly important if the optical sensors are used in bad weather for autonomous driving or driver assistance systems. By entering a planned route and taking into account a weather forecast, an amount of washing liquid required for the journey is estimated. If the amount of washing liquid determined by the sensor for measuring the filling level falls below the amount of washing liquid required for the journey, a visual and/or acoustic warning is issued in the vehicle via the above-mentioned component, i.e. the loudspeaker or the display. Accordingly, a situation where autonomous driving or driver assistance systems can no longer be used during a journey because cleaning of the optical sensors is not possible can be avoided.

The device 1 for ascertaining the property of a fluid mixture formed of a plurality of fluids is used for the washing system 50 of the vehicle 70, and a thermal conductivity thereof is ascertained as the property. The washing system 50 has the fluid container 30 for storing the washing liquid, and a detection component can be provided that detects when liquids are filled in and/or drained from the washing fluid container 30. For example, if one of the fluids, ethanol or water, is filled in the washing fluid container 30, it can be assumed that a mixing ratio and consequently also a thermal conductivity of the washing liquid will change. Accordingly, based on a detection of a filling of the fluid container 30 with a fluid, for example, an ascertainment of the thermal conductivity can be started to determine whether the washing liquid continues to have a predetermined thermal conductivity. Accordingly, it is possible to reduce a frequency of ascertaining the thermal conductivity.

As described above, the washing liquid is formed of two fluids, water and ethanol, each of which has a thermal conductivity which is known. The analysis unit 10 according to another embodiment can then also be configured to determine a concentration as the property of the fluid mixture by comparing the thermal conductivity of the fluid mixture with the thermal conductivities of the two fluids. This embodiment has the advantage of providing a driver of the vehicle with an easy-to-understand indication of the mixture ratio.

If a freezing point of each of the two fluids is known, the analysis unit 10 can additionally be configured, according to a further embodiment, to determine a freezing point as the property of the fluid mixture using the concentration of the fluid mixture. The driver can then be informed of the freezing point of the washing liquid by a suitable display, so that the driver can accurately judge whether a mixing ratio of the washing liquid should be changed so that freezing thereof is reliably prevented.

Figure 4:
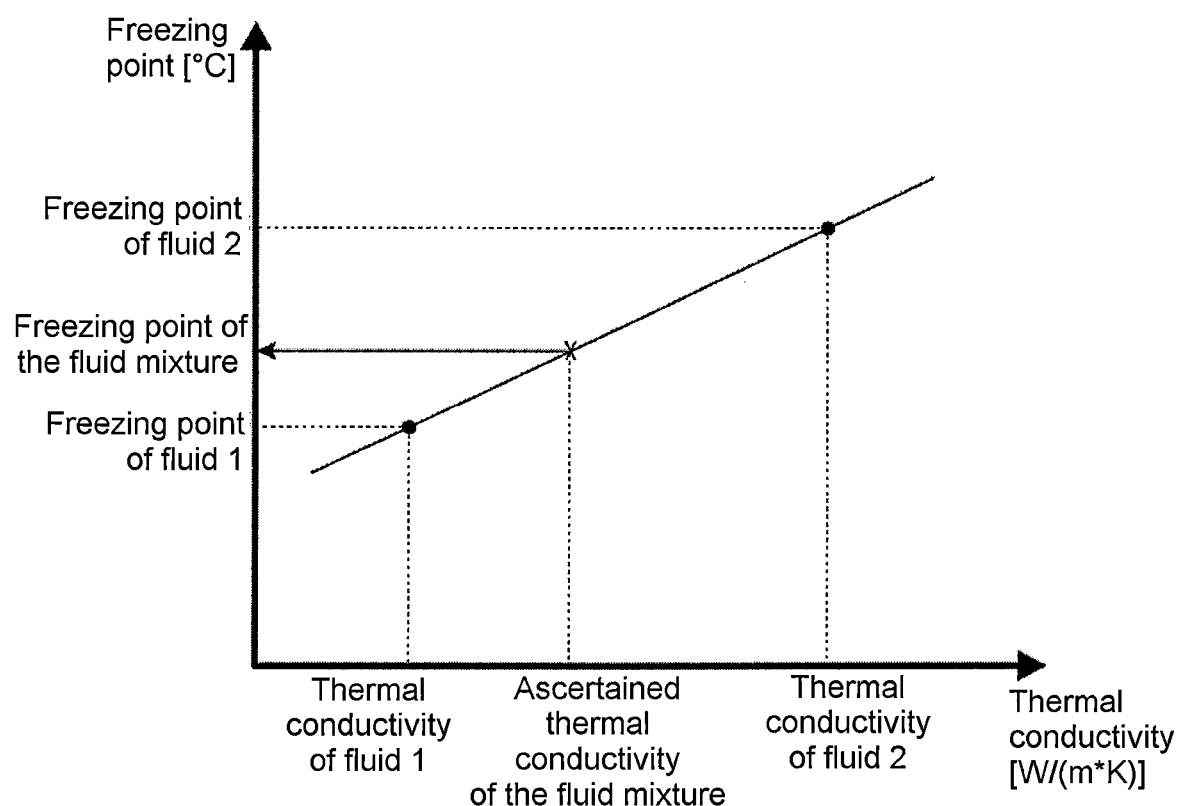
FIG. 4 shows a diagram schematically illustrating a straight line for ascertaining a freezing point of a fluid mixture.

If a thermal conductivity and a freezing point of the fluid mixture are known in each case, the analysis unit 10 can be configured according to another embodiment to ascertain a freezing point as the property of the fluid mixture by comparing the thermal conductivity with a straight line. The straight line is here obtained, as shown in FIG. 4, by a linear interpolation in which the thermal conductivity and the freezing point of the fluids are each used as a sampling point. For this purpose, the values of the thermal conductivity of the two fluids are both plotted on the x-axis of a Cartesian coordinate system, and the values of the freezing points of the two fluids are both plotted on the y-axis of the Cartesian coordinate system. The freezing point of the fluid mixture can then be ascertained, as shown by an arrow in FIG. 4, by comparing the ascertained thermal conductivity of the fluid mixture with the straight line as a corresponding value on the y-axis. The driver can then also be informed of the freezing point of the washing liquid so that he can accurately judge whether a mixing ratio of the washing liquid is suitable for a particular temperature.

As mentioned above, the washing system 50 is installed in the vehicle 70 and is used in particular for cleaning an optical sensor used for a driver assistance system and/or a system for autonomous driving. However, the washing system 50 can also be used to clean a light source and/or a window of the vehicle 70. In addition to the fluid container 30, the washing system 50 has further components, such as lines, pumps, spray nozzles, wipers, etc., that are required for cleaning the optical sensor, light source, or window.

Figure 3:
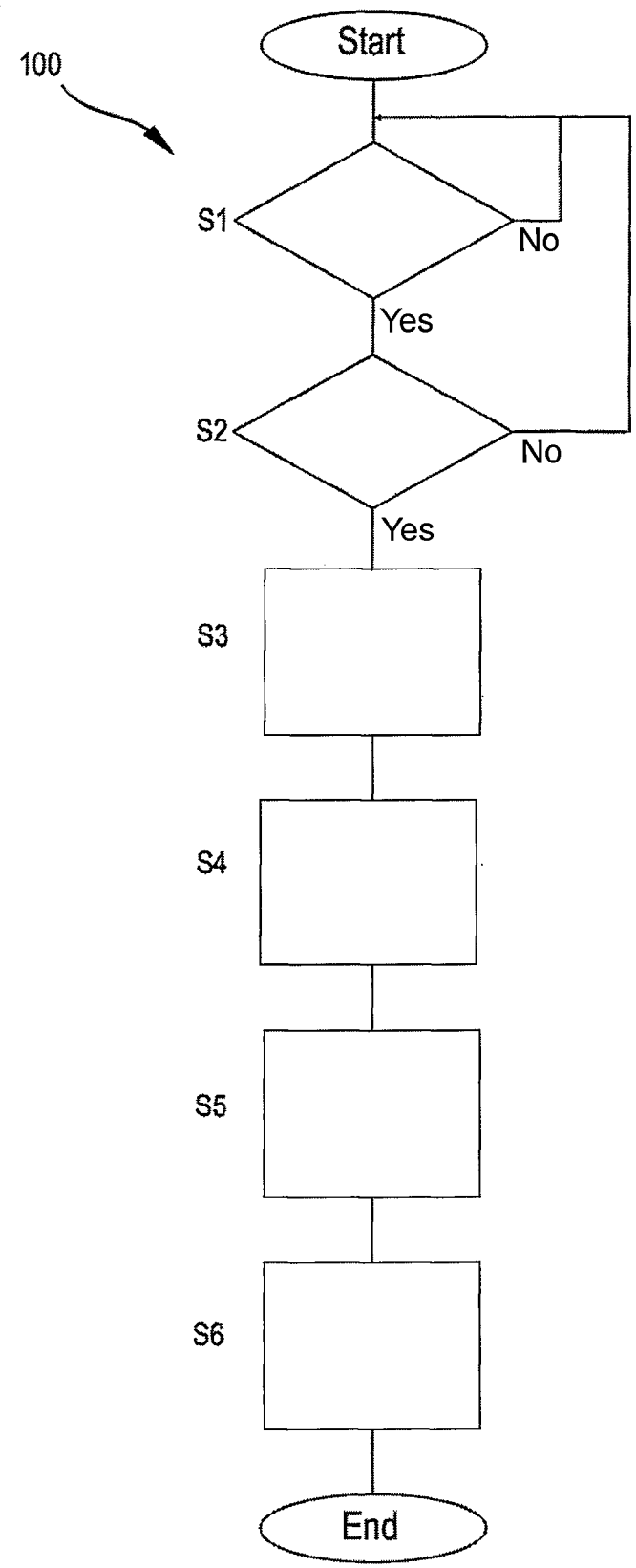
FIG. 3 shows a flowchart of a method for ascertaining a thermal conductivity of a fluid when using the first conductor and the second conductor.

In the following, steps S1 to S6 of a method 100 for ascertaining the thermal conductivity of a fluid or fluid mixture are described with reference to FIG. 3. In this regard, the analysis unit 10 is configured to control the other components of the device 1 for ascertaining the thermal conductivity so that the individual steps S1 to S6 of the method 100 are executed. In order to obtain further information, the analysis unit 10 is additionally capable of communicating with other units and components not shown, such as the detection components for detecting a filling/draining, which are installed in the vehicle 70 and are communicatively connected to one another via, for example, a vehicle bus. In this case, the method 100 is stored in the form of software in the RAM or ROM and is executed by executing instructions by the CPU and outputting and receiving signals at the I/O ports.

In step S1, it is checked whether an ignition of the vehicle 70 is turned on and/or off. If it is not detected that the ignition is turned on and/or off (No in S1), the process waits until an appropriate signal is received. If the ignition is turned on and/or off (Yes in S1), S2 is executed.

In S2, based on a signal received from the detecting component, it is determined whether it is detected that a fluid is filled in and/or drained from the fluid container 30. If it is not determined that a filling and/or draining has occurred (No in S2), processing returns to the beginning of the process. If it is determined that filling and/or draining has occurred, processing proceeds to step S3.

It should be noted that the method 100 can also be executed without steps S1 and S2 so that the method 100 starts directly with step S3. In this case, the method 100 is repeated at a predetermined interval. The method 100 can also have only one of the two steps S1 or S2. The order of the two steps S1 and S2 can also be changed.

In S3, the analysis unit 10 controls the actuation unit 6 to apply the AC voltage to the measuring bridge 4, and the method 100 proceeds to step S4.

In S4, the voltage detection unit 8 detects the bridge voltage Ub or an amplified voltage Uv corresponding to the bridge voltage Ub, and the method 100 proceeds to S5.

In S5, the analysis unit 10 filters the signal component of the voltage Uv corresponding to three times the frequency of the voltage applied to the measuring bridge 4 and ascertains the thermal conductivity of the washing liquid therefrom.

In S6, which can be optionally executed, the concentration and/or the freezing point of the washing liquid is ascertained in the manner described above. However, it is not necessary to ascertain these parameters so that the method 100 can also be carried out without step S6.

The apparatus 1, the method 100 for ascertaining a thermal conductivity of a fluid or the fluid mixture, and the fluid container 30 have been described for use in the washing system 50 for the vehicle 70. It should be noted that the device 1 and the method 100 are not limited thereto and are applicable to any field in which a thermal conductivity of a fluid must be determined. In addition, the washing system 50 according to the invention is not limited to an application in the vehicle 70 and can be used for surveillance cameras, weather sensors or other units where freezing of a washing liquid shall be reliably prevented to ensure cleaning even at low temperatures.

Figure 5:
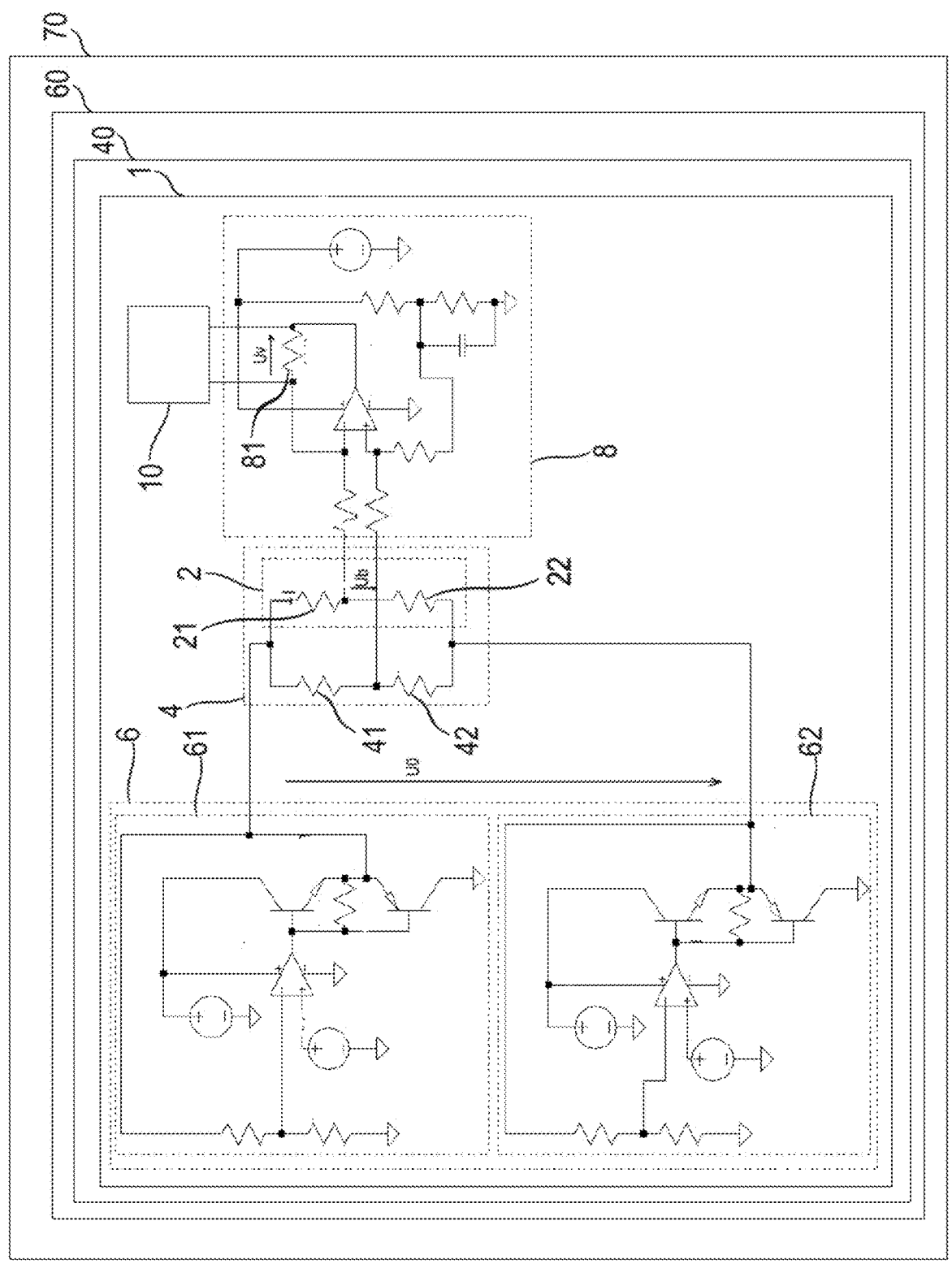
FIG. 5 schematically shows a circuit diagram of a device for ascertaining a thermal conductivity used in a fluid container of an exhaust gas after-treatment device for a vehicle.

Another embodiment of the present invention is described below. FIG. 5 schematically shows a circuit diagram of the device 1 for ascertaining a thermal conductivity of a fluid or fluid mixture. In the present embodiment, the fluid mixture is, in particular, an aqueous urea solution which is mixed from water and urea and is used as a liquid for the exhaust gas after-treatment in a device 60 for the exhaust gas after-treatment in a vehicle 70. Accordingly, the device 1 for ascertaining a thermal conductivity of a fluid mixture is provided in or on a fluid container 40 of the device 60 for exhaust gas after-treatment.

In the present embodiment, a thermal conductivity of the aqueous urea solution is used as a measure of the mixing ratio of urea to water. An aqueous urea solution suitable for exhaust gas after-treatment has a concentration of 32.5%, so that the aqueous urea solution has a thermal conductivity of 0.57 W/(m·K). If the ascertained thermal conductivity deviates from the specified thermal conductivity, the aqueous urea solution does not have the required urea concentration. Accordingly, it may be necessary to replace the aqueous urea solution stored in the fluid container 40 or to top up with water or urea.

Figure 6:
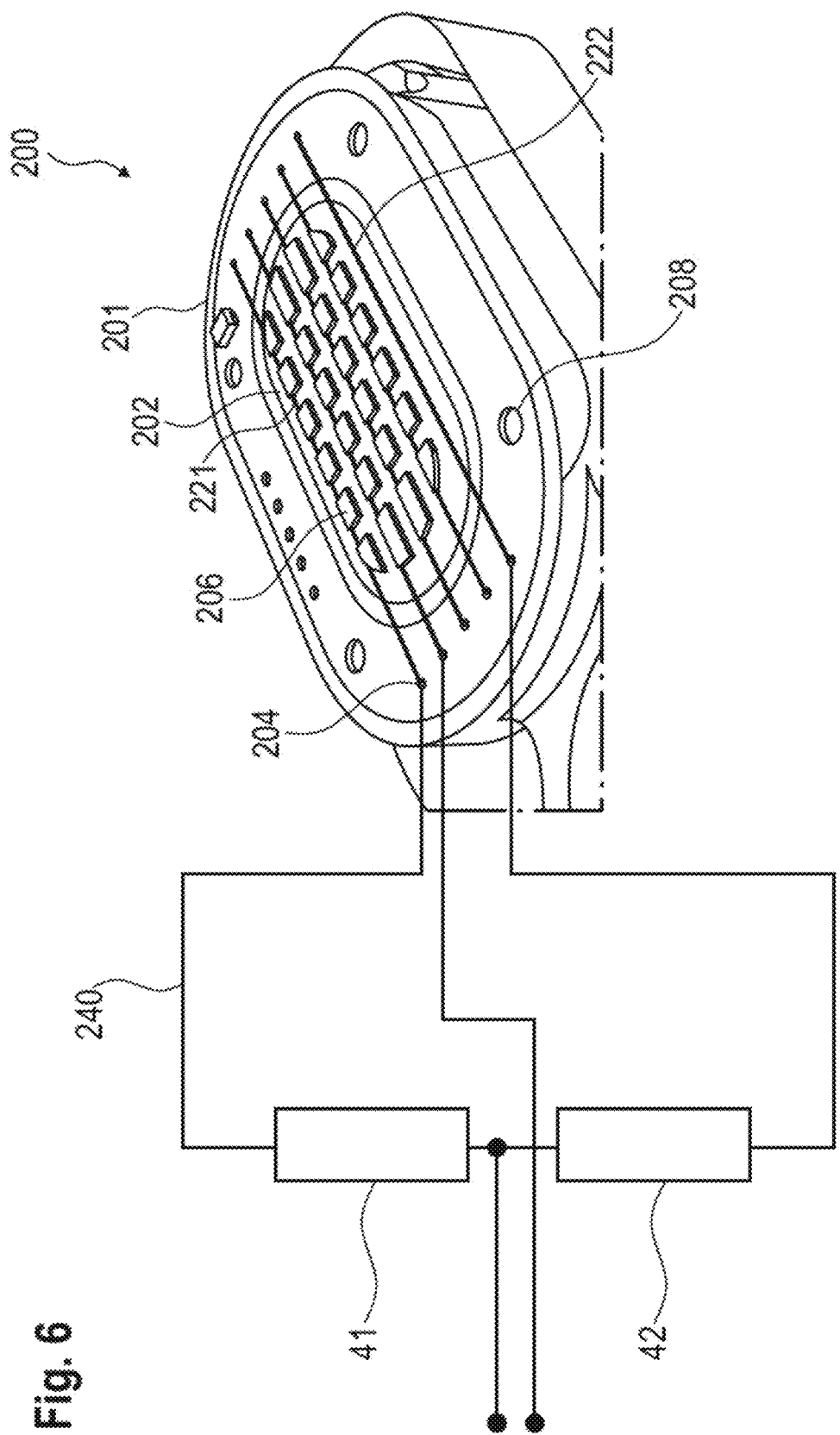
FIG. 6 and FIG. 7 show a measuring bridge with a conductor assembly in which the first and second conductors are designed as wires.
Figure 7:
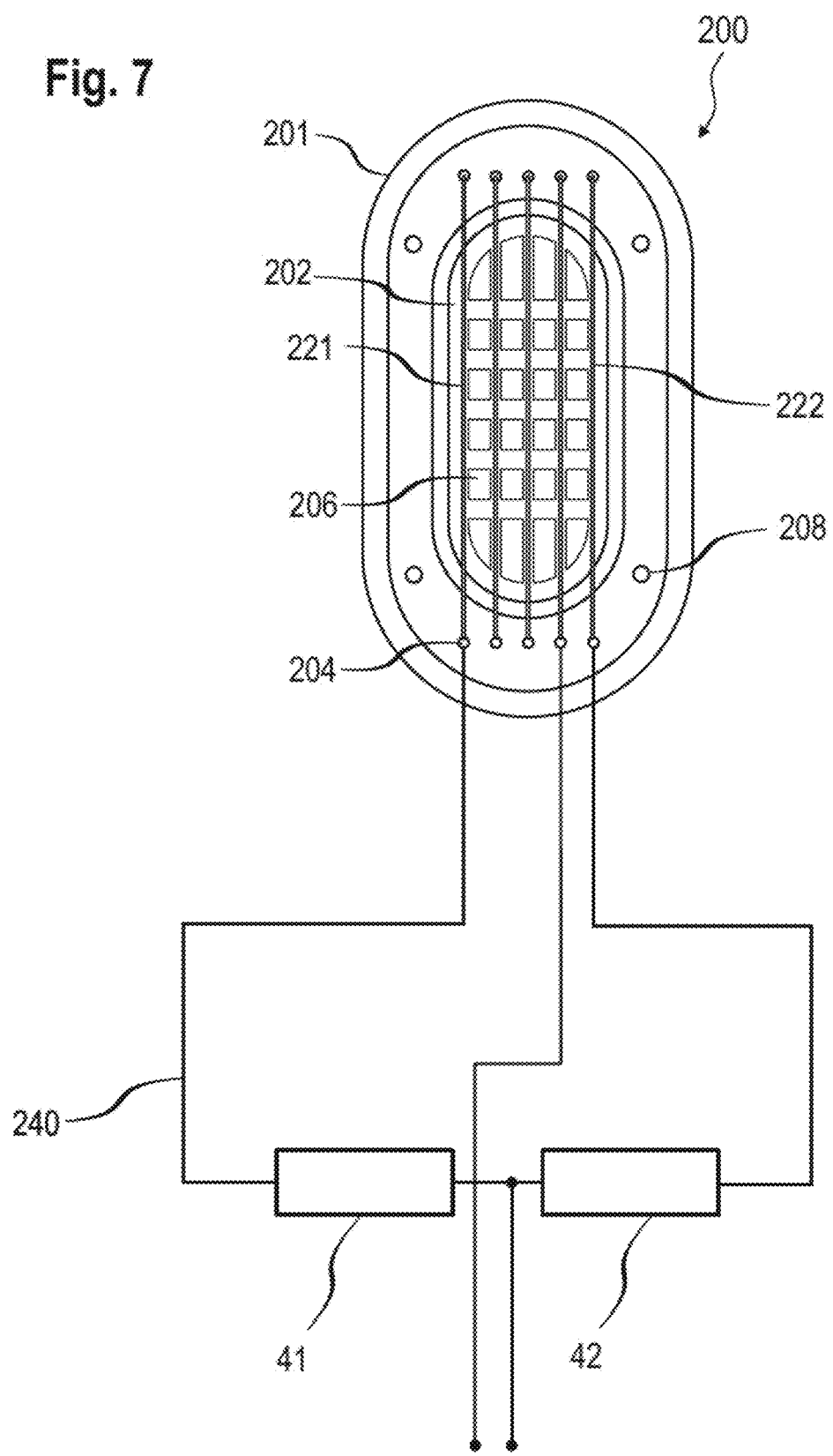

FIG. 6 and FIG. 7 show a measuring bridge 240 having a conductor assembly 200 in which a first conductor 221 and a second conductor 222 are formed as wires. A wire is understood to be a metallic conductor with a round or square cross-section, which is attached to a holding assembly only at its two ends. The portion in between is fully surrounded by the fluid mixture.

In this case, the first conductor 221 has a length that is several times, preferably four times, the length of the second conductor 222 and for this reason has a cross-section which is smaller than the cross-section of the second conductor 222 by the ratio of the length of the first conductor 221 to the length of the second conductor 222. Accordingly, the first conductor 221 and the second conductor 222 have the same resistance value in a currentless state. In order to reduce the spatial extent of the conductor assembly 200, the first conductor 221 is disposed on the conductor assembly 200 in a meandering or looping manner. It should be noted that the cross-section of the two conductors 221 and 222 in FIG. 6 and FIG. 7 is drawn the same for drawing reasons. The cross-sections of the two conductors 221 and 222 actually differ from each other.

The two conductors 221 and 222 are stretched over a recessed surface 202 of a holding assembly 201 in a plane parallel to the recessed surface 202, so that the fluid or fluid mixture fully surrounds and flows around them. In this way, the two conductors 221 and 222 can be fully brought into contact with the fluid. In this way, a detection accuracy of the thermal conductivity can be further improved by the device according to the invention.

In an edge region of the conductor assembly 200, the two conductors 221 and 222 are guided via openings 204 to form the individual meanders. Elastic elements, for example spring elements (not shown), can be arranged in the conductor assembly 200 to bias the two conductors 221 and 222 so that a change in length due to heating in the current-conducting state is balanced, thus compensating both a change in length of the conductor assembly 200 and a change in length of the two conductors 221 and 222. In this way, the two conductors 221 and 222 or adjacent meanders or loops of the first conductor 221 can be prevented from contacting one another, and a short circuit can thereby be reliably prevented. In addition, a change in length or shape of the holding assembly 201 due to a change in temperature can also be compensated.

Cuboidal protuberances 206 are arranged between the two conductors 221 and 222 and the meanders of the first conductor 221. The protuberances 206 extend from the recessed surface 202 to a plane that is also parallel to the recessed plane and is further spaced from the recessed surface 202 than the plane in which the first and second conductors 221 and 222 are disposed. Accordingly, the protuberances 206 also prevent the first and second conductors 221 and 222 and the meanders of the first conductor 221 from coming into contact. In addition, freezing of a major portion in the region of the conductor assembly 200 is prevented by the protuberances 206. This is necessary because an aqueous urea solution for exhaust gas after-treatment has a freezing point of −11° C., and therefore the case where the aqueous urea solution freezes may occur on cold winter days. In addition, an antifreeze content of a washing liquid can be too low, so that it can also freeze on cold winter days. Due to this limitation, a frozen portion of the fluid mixture in the region of the conductor assembly 200 can be thawed more quickly by a heater arranged in the fluid container 40 for the aqueous urea solution so that a reliable ascertainment of the thermal conductivity of the washing liquid or of the aqueous urea solution can be made more quickly after a start of the vehicle 70.

The two resistors 41 and 42 of the other branch of the measuring bridge 240 are designed as resistors having fixed resistance values. The resistance values of the two resistors 41 and 42 are here selected such that the measuring bridge 240 is balanced in a currentless state. The two resistors 41 and 42 and the conductor assembly 200 with the first and second conductors 221 and 222 can be arranged on a common assembly, such as a common circuit board, or can be arranged so as to be spatially separated from one another and connected to one another via cables or lines.

Holes 208 are formed in the edge region of the holding assembly 201, into which pins of a cover or lid (not shown) for the conductor assembly 200 can be inserted. Alternatively, screws can also be threaded into the holes where threads are formed to connect the cover to the holding assembly 201. The lid can further prevent freezing of a larger region of the aqueous urea solution in the region of the two conductors 221 and 222. In order for the fluid mixture to remain contactable with the first and second conductors 221 and 222, the lid includes slots or holes through which the fluid mixture can flow to the first and second conductors 221 and 222. In addition, the lid can reduce a risk of mechanical damage to the first and second conductors 221 and 222.

Figure 8:
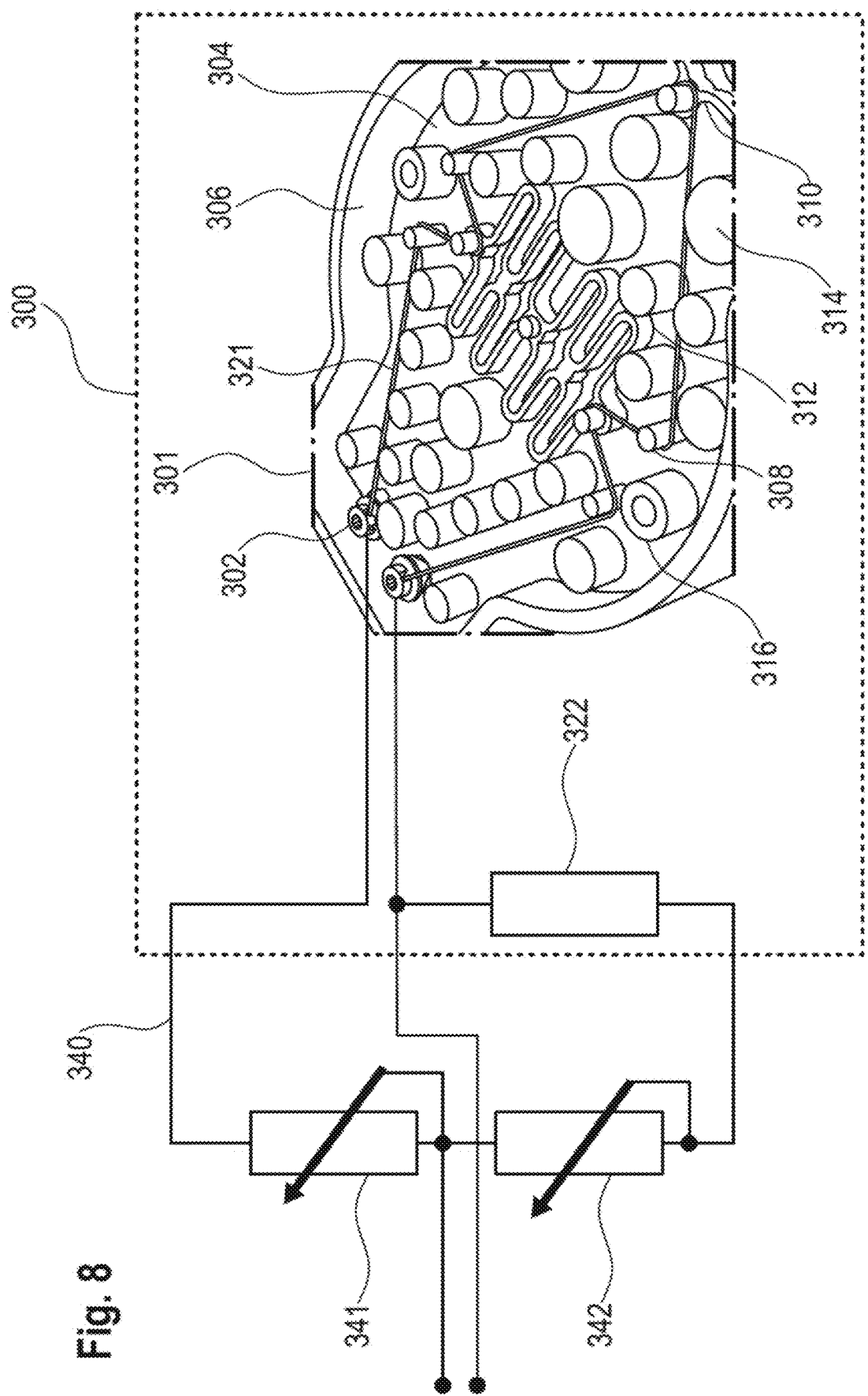
FIG. 8 and FIG. 9 show a measuring bridge with a conductor assembly in which a first conductor designed as a wire and a fixed resistor are connected in series.
Figure 9:
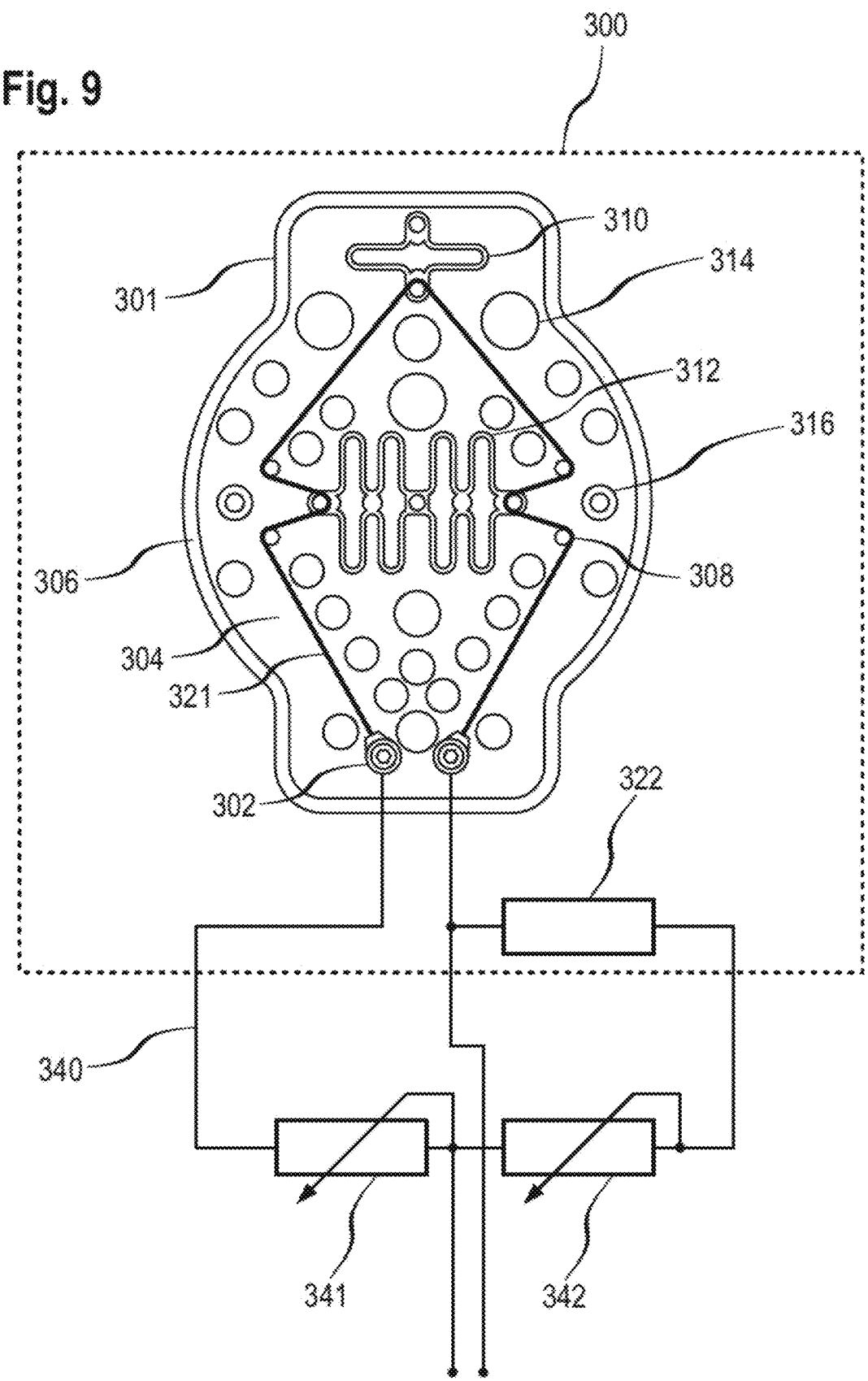

FIG. 8 and FIG. 9 show a measuring bridge 340 according to a further embodiment of the present invention. In the measuring bridge 340, one of the voltage dividers is formed by a conductor assembly 300 according to another embodiment. In the conductor assembly 300, a first conductor 321 which is formed as a wire and is attached to a holding assembly 301, and a fixed resistor 322 are connected in series. When this conductor assembly 300 is applied, it is not necessary for the fixed resistor 322 to be brought into contact with the fluid and it is sufficient to bring only the first conductor 312 into contact with the fluid.

The other of the voltage dividers is formed by two adjustable resistors 341 and 342. The resistors 341 and 342 are resistors the resistance value of which is variable, and are preferably designed as digital potentiometers. In this embodiment, the analysis unit 10 is configured to set or change the resistance values of the resistors 341 and 342 such that the measuring bridge 340 is balanced when the AC voltage U0 is initially applied.

In this embodiment, the conductor assembly 300 only includes a first conductor 321 that is formed as a wire. The first conductor 321 is connected at terminals 302 to lines of the measuring bridge 340. The terminals 302 in the embodiment shown in FIG. 8 and FIG. 9 are screw-type terminals, but it is also possible to design the terminals as clamp-type or plug-type terminals. Accordingly, the holding assembly 301 can be easily mounted and removed.

In the example shown in FIG. 8 and FIG. 9, the first conductor 321 is laid as a loop and is arranged in a plane parallel to a bottom surface 304 of the holding assembly 301. A frame 306 is formed around the bottom surface 304, such that the holding assembly 301 is formed as a recessed housing in which a small amount of fluid is present. The holding assembly 301 formed in this manner ensures that the first conductor 321, which is formed as a wire, is substantially fully surrounded by the fluid over the entire length. Accordingly, a detection accuracy is further improved.

The first conductor 321 is guided via deflection points 308 and is biased by elastic elements to balance a change in length due to heating in the current-conducting state and a change in shape or length of the holding assembly 301 in response to a change in temperature. In the present embodiment, the elastic elements are spring elements 310 and 312. A first spring element 310 biases the first conductor 321 in a direction of an outer side of the loop. A second spring element 312 biases the first conductor 321 toward an inner side of the loop by pulling two opposite portions of the first conductor 321 together by the second spring element 312. In this way, contact of the first conductor 321 with itself or with other elements of the conductor assembly 300 is reliably prevented. Consequently, a short circuit of the first conductor 321 can be reliably prevented. In addition, a change in shape or length of the holding assembly 301 due to a change in temperature can be compensated.

In turn, protuberances 314 or projections are arranged inside and outside the loop of the first conductor 321 to further reliably prevent the first conductor 321 from contacting itself or surrounding elements. The protuberances 314, which are cylindrical in the example shown in FIG. 8 and FIG. 9, also delimit a spatial extent of a frozen portion in the region of the first conductor 321 so that the frozen portion of the aqueous urea solution can be quickly thawed after a start of a heating operation.

The holding assembly 301 has two hollow cylinders 316 in a central region on the outer sides, into which pins of a lid or cover (not shown) can be inserted or into which screws can be screwed to connect the lid to the holding assembly 301. Here, the lid rests on the frame 306 of the conductor assembly 300 and is again formed with slots or holes to allow fluid to enter the interior of the conductor assembly 300. The lid further prevents freezing of the aqueous urea solution or the washing liquid in the area of the holding assembly 301, and reduces a risk of mechanical destruction of the holding assembly 301 or the first conductor 321.

The holding assembly 301 is not limited to the first conductor 321, and a second conductor can also be arranged on a similar conductor assembly. In addition, the conductor assembly 300 can also be configured such that both the first conductor and the second conductor are attachable to the conductor assembly 300. For this purpose, the two conductors can be guided one above the other in two parallel planes, or the second conductor, which has a shorter length than the first conductor, can also be formed inside the loop of the first conductor as a loop, which may also be prestressed by elastic elements.

Figure 10:
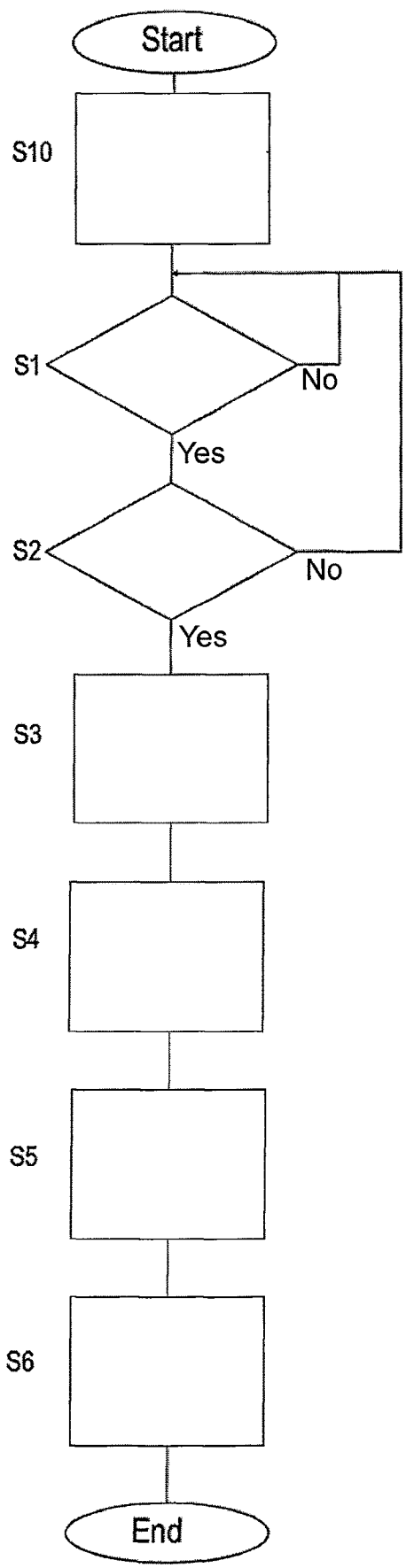
FIG. 10 shows a flowchart of a method for ascertaining a thermal conductivity of a fluid when using the fixed resistor.

FIG. 10 shows a flowchart of a method 400 that is executed when the measuring bridge 340 shown in FIG. 8 and FIG. 9 is used. The method 400 differs from the method 100 shown in FIG. 3 in that a step S10, in which the analysis unit 10 balances the measuring bridge 340 by adjusting the resistance values of the two resistors 341 and 342, is executed before the step S1.

In this case, an adjustment of the measuring bridge 340 is carried out as follows. The analysis unit 10 is designed to cause at least one of the two transistor booster stages 61, 62 to apply a DC voltage to the measuring bridge 340. In this case, the DC voltage has a value of 200 mV. However, the value of the DC voltage can also be between 100 mV and 500 mV inclusive. The bridge voltage Ub is then detected and the analysis unit 10 changes the two adjustable resistors 341 and 342. A DC voltage is then again applied to the measuring bridge 340 and the bridge voltage Ub is detected. This process is performed until the bridge voltage Ub, which is detected in response to the applied DC voltage, is substantially equal to a voltage of 0 V. Consequently, the measuring bridge 340 can be reliably balanced. Advantageously, this procedure is preferably carried out during a start-up or a start of a detection of the thermal conductivity in order to initially balance the measuring bridge 340.

Alternatively or additionally, the analysis unit 10 can be designed to filter out a signal component of the bridge voltage Ub which corresponds to the onefold frequency of the AC voltage U0 applied to the measuring bridge 340. The amplitude of this signal component of the bridge voltage Ub can be used as a measure of the detuning of the measuring bridge 340, and the analysis unit 10 is designed to change the resistance value of the adjustable resistors 341 and 342 in step S10 such that the signal component of the bridge voltage corresponding to the onefold frequency of the applied AC voltage Ub is substantially 0 V. This approach offers the advantage that detuning of the measuring bridge 340 can be detected during a measurement operation.

Accordingly, detuning of the measuring bridge 340 that occurs, for example, as a result of heating during an operation can be detected and the measuring bridge 340 can subsequently be adjusted.

Figure 11:
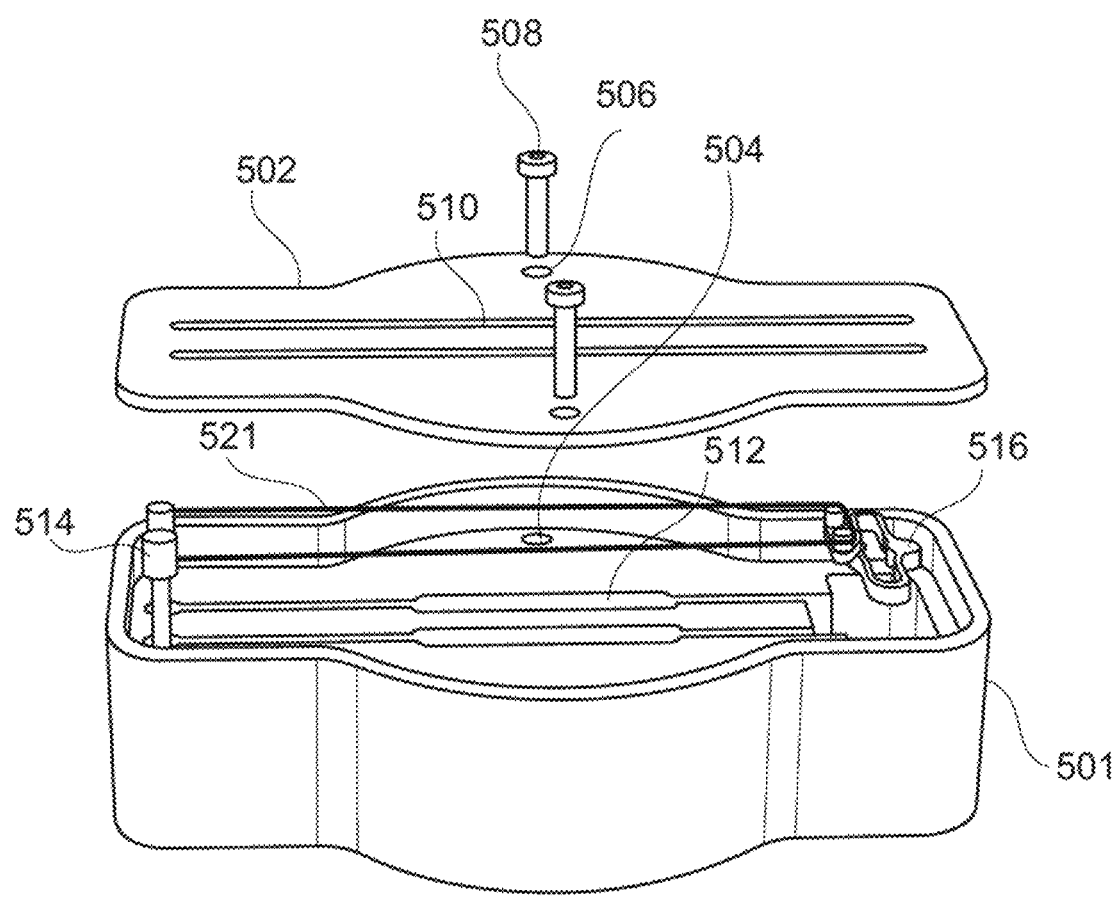
FIG. 11 shows an embodiment of a holding assembly for holding a conductor formed as a wire.

FIG. 11 shows a holding assembly 501 according to one embodiment, which is covered by a cover 502. To connect the cover 502 to the holding assembly 501, the holding assembly 501 and the cover 502 have registered holes 504 and 506, into which pins 508 can be inserted. Alternatively, the holding assembly 501 and the cover 502 can be connected by screws or rivets. In this case, the holes have, for example, a thread for the screw or are formed in such a way that a rivet can be supported therein. As shown in FIG. 11, the cover 502 has two slots 510 through which the fluid, the property of which shall be ascertained, can communicate with a conductor 521 formed as a wire.

The holding assembly 501 shown in FIG. 11 further differs from the previous embodiments in that the conductor 521 is disposed in a groove portion 512. Accordingly, the portions outside the groove portion 512 correspond to the protuberances according to the previous embodiments. The conductor 521 is connectable to a measuring bridge, such as the measuring bridge 340 according to the preceding embodiment, via two contact pins 514. Furthermore, the conductor 521 is biased via an elastic element, in particular the spring element 516, so that a change in length of the conductor 312 and/or a change in length or shape of the holding assembly 510 due to a change in temperature can be balanced. Accordingly, a destruction of the conductor 521 formed as a wire can be reliably prevented.

The invention can be implemented according to the following aspects.

According to a first aspect, a device for ascertaining a property of a fluid comprises: an electric conductor assembly which is designed to be at least partly brought into contact with the fluid and which is designed as a voltage divider with two elements, wherein the first element is a first conductor which, at least in a current-conducting state, has a resistance value that differs from that of the second element, a measuring bridge with two voltage dividers connected in parallel, one of the voltage dividers being formed by the electric conductor assembly, an actuation unit for applying an AC voltage to the measuring bridge, a voltage detection unit for detecting a bridge voltage, and an analysis unit which is configured to ascertain a thermal conductivity as the property of the fluid by analyzing the bridge voltage using the 3-omega method.

According to a second aspect, which may depend on the first aspect, the second element is a second conductor and the first conductor and the second conductor have an equal resistance value in a currentless state and the first conductor heats up more than the second conductor in a current-conducting state.

According to a third aspect, which may depend on the second aspect, a cross-sectional area of the first conductor is smaller than that of the second conductor.

According to a fourth aspect, which may depend on the first aspect, the second element is a fixed resistor and the first conductor has a resistance value that differs from that of the fixed resistor, at least in a current-conducting state, the other of the voltage dividers of the measuring bridge is formed by two adjustable resistors, and the analysis unit is configured to set, prior to an application of the AC voltage, the two adjustable resistors such that the measuring bridge is balanced.

According to a fifth aspect, which may depend on any one of the first to fourth aspects, the first conductor and/or the second conductor are arranged on a circuit board or a holding assembly at least in sections in a meandering manner or in the form of a loop.

According to a sixth aspect, which may depend on any one of the first to fifth aspects, the first conductor and/or the second conductor are formed as wires.

According to a seventh aspect, which may depend on any one of the first to sixth aspects, the fluid is a fluid mixture formed from two fluids, each of which has a known thermal conductivity, and the analysis unit is configured to determine a concentration of the fluid mixture as the property of the fluid mixture by comparing the thermal conductivity of the fluid mixture with the thermal conductivities of the two fluids.

According to an eighth aspect, which may depend on the seventh aspect, a freezing point of each of the two fluids is known, and the analysis unit is configured to ascertain a freezing point as the property of the fluid mixture using the concentration of the fluid mixture.

According to a ninth aspect, which may depend on any one of the first to sixth aspects, the fluid is a fluid mixture formed of two fluids, each of which has a thermal conductivity and a freezing point which are known, and the analysis unit is configured to ascertain a freezing point as the property of the fluid mixture by comparing the thermal conductivity with a straight line obtained by a linear interpolation in which the thermal conductivity and the freezing point of the two fluids are used as sampling points.

According to a tenth aspect, which may depend on any one of the first to ninth aspects, the analysis unit is configured to filter a signal component of the bridge voltage having the onefold or multiple frequency, preferably the triple frequency, of the AC voltage by means of a software-implemented synchronous rectifier.

According to an eleventh aspect, a fluid container comprises a device according to any one of the first to tenth aspects.

According to a twelfth aspect, which may depend on the eleventh aspect, the fluid container comprises a sensor for a filling level measurement.

According to a thirteenth aspect, which may depend on the twelfth aspect, the device according to any one of the first to tenth aspects and the sensor for the filling level measurement are formed as a common module.

According to a fourteenth aspect, a vehicle comprises a washing device used for cleaning a vehicle component and/or an optical sensor and/or a light source and/or a window, and/or an exhaust gas after-treatment device which comprise a fluid container according to any one of the tenth to thirteenth aspects.

According to a fifteenth aspect, a method for ascertaining a property of a fluid comprising the following steps: applying an AC voltage to a measuring bridge, detecting a bridge voltage, ascertaining a thermal conductivity as the property of the fluid by evaluating the bridge voltage using the 3-omega method.

The invention claimed is:

1. A device for ascertaining a property of a fluid, having:
   an electric conductor assembly which is designed to be at least partly brought into contact with the fluid and which is designed as a voltage divider with two elements, wherein the first element is a first conductor which, at least in a current-conducting state, has a resistance value that differs from that of the second element;
   a measuring bridge with two voltage dividers connected in parallel, one of the voltage dividers being formed by the electric conductor assembly;
   an actuation unit for applying an AC voltage to the measuring bridge;
   a voltage detection unit for detecting a bridge voltage of the measuring bridge; and
   an analysis unit which is configured to ascertain a thermal conductivity as the property of the fluid by analyzing the bridge voltage using the 3-omega method,
   wherein
   the first conductor is formed as a wire.

2. The device according to claim 1, wherein
   the second element is a second conductor, which is also formed as a wire.

3. The device according to claim 1, wherein
   the first conductor and/or the second conductor are arranged on a holding assembly.

4. The device according to claim 3, wherein
   the first conductor and/or the second conductor are arranged on the holding assembly at least in sections in a meandering manner or in the form of a loop.

5. The device according to claim 3, wherein
   the first conductor and/or the second conductor are pre-stressed by mans of an elastic element.

6. The device according to claim 5, wherein
   the elastic element is designed as a spring element.

7. The device according to claim 3, wherein
   protuberances are formed on the holding device assembly between the first conductor and/or the second conductor.

8. The device according to claim 7, wherein
   the protuberances are formed by arranging the first conductor and/or the second conductor in a groove or in a groove portion.

9. The device according to claim 3, wherein
   the holding assembly is protected by a cover or a lid, which are each formed such that the fluid can pass therethrough in order to come into contact with the first conductor and/or the second conductor.

10. The device according to claim 9, wherein
    the cover or lid is formed with slots or holes.

11. A fluid container having a device according to claim 1.

12. The fluid container according to claim 11, having a sensor for a filling level measurement.

13. The fluid container according to claim 12, wherein
    the device and the sensor for the filling level measurement are formed as a common module.

14. A vehicle having a washing device for cleaning a vehicle component and/or an optical sensor and/or a light source and/or a window, and/or an exhaust gas after-treatment device, the washing device having the fluid container according to claim 11.

15. A method for ascertaining a property of a fluid by means of a device according to claim 1, comprising the following steps:
    applying the AC voltage to the measuring bridge,
    detecting the bridge voltage, and
    ascertaining the thermal conductivity as the property of the fluid by evaluating the bridge voltage using the 3-omega method.

* * * * *